United States Patent [19]

Heidenreich et al.

[11] Patent Number: 5,685,886
[45] Date of Patent: Nov. 11, 1997

[54] APPARATUS FOR GAS WASHING

[75] Inventors: Hubert Heidenreich, Mannheim; Hans Peter Cuntz, Ketsch; Roland Werner, Worms, all of Germany

[73] Assignee: Friatec Aktiengesellschaft Keramik- und Kunstoffwerke, Mannheim, Germany

[21] Appl. No.: 544,980

[22] Filed: Oct. 30, 1995

[30] Foreign Application Priority Data

Oct. 29, 1994 [DE] Germany .................. 44 38 686.9

[51] Int. Cl.⁶ ............................................. B01D 47/08
[52] U.S. Cl. ........................... 55/230; 55/247; 261/91
[58] Field of Search .......................... 55/230, 231, 232, 55/244, 247, 223; 261/91, 92

[56] References Cited

U.S. PATENT DOCUMENTS

| | | | |
|---|---|---|---|
| 632,370 | 9/1899 | Rossler | 55/230 |
| 1,952,269 | 3/1934 | Lundquist | 55/230 X |
| 2,221,010 | 11/1940 | Van Vliet | 261/91 X |
| 2,339,982 | 1/1944 | Dalton | 55/230 |
| 2,527,015 | 10/1950 | Lhota | 261/91 |
| 3,334,471 | 8/1967 | Herron | 55/224 |
| 4,594,081 | 6/1986 | Kroll et al. | 55/222 |

FOREIGN PATENT DOCUMENTS

| | | |
|---|---|---|
| 330096 | 8/1989 | European Pat. Off. . |
| 3008240 | 9/1981 | Germany . |
| 3122026 | 1/1983 | Germany . |
| 3324124 | 8/1984 | Germany . |

*Primary Examiner*—Richard L. Chiesa
*Attorney, Agent, or Firm*—Evenson, McKeown, Edwards & Lenahan P.L.L.C.

[57] ABSTRACT

An apparatus for scrubbing or washing a gas having a chamber, which is partially filled with a washing liquid, and into which the gas to be washed flows and the washing liquid is sprayed by a rotatable device for pumping liquid from the chamber and spraying the liquid into the chamber. The apparatus has a compact construction and requires only a small surface on which to stand, but nevertheless provides for low pressure losses. The chamber is composed of first and second chamber parts which are arranged next to one another and are separated by a partition arranged between them so as to project from above at least partially into the washing liquid in the chamber, the two chamber parts being connected with one another in a deflection area above the liquid.

17 Claims, 5 Drawing Sheets

APPARATUS FOR GAS WASHING

BACKGROUND OF THE INVENTION

This invention relates to an apparatus for gas purification or gas washing by means of liquid, comprising a chamber into which the gas to be washed flows, the chamber being arranged in a housing and being partially filled with the liquid, and the chamber containing a spraying body in which liquid can be transported from the chamber and by means of which the liquid is sprayed into the chamber.

European Patent Application No. EP 330,096 B1 discloses an apparatus of this type for gas washing whose transporting body, together with a spraying wheel, is arranged so that it can be rotated about a common axis of rotation by means of a driving motor. The apparatus contains a chamber with the washing liquid into which the transporting body projects, the gas to be washed, particularly exhaust air, also flowing through the chamber. Corrosive and/or toxic gases, such as perchloric acid, hydrofluoric acid, sulfuric acid, hydrochloric acid or nitric acid as well as their mixtures are absorbed practically directly where they occur. The spraying wheel contains ducts with radially exterior nozzles through which the liquid transported upwards by means of the transporting body is sprayed under pressure into the chamber, which results in a strong swirling and intensive mixing of the exhaust air or harmful gases with a liquid mist. The introduction of the gas to be washed takes place from the underside by means of a tube extending through the bottom of the apparatus from which the gas flows into the chamber. In this case, a multiple deflection takes place along a relatively short path. In addition, the guiding of the gas from and after the emergence of the gas from the chamber requires multiple flow deflections. The resulting pressure losses may limit the application possibilities of the known apparatus and require the use of a comparatively powerful ventilator driving motor. Furthermore, the apparatus requires a relative large base surface. Thus, the apparatus cannot be installed without difficulty in a tight and/or installation space, for example, directly next to a laboratory exhaust. In the known apparatus, aerosol traps are arranged only at a low height above the level of the liquid, and the gas must be deflected from the chamber in a small space and be guided to the aerosol traps, which results in disadvantages with respect to the flow conditions as well as the pressure drop. Finally, the servicing and assembly operations require considerable expenditures, particularly since agglomerating devices, aerosol traps as well as mist collectors are not easily accessible and may have to be disassembled for service, thereby incurring high servicing costs.

Published German Patent Application No. DE 3,008,240 discloses a centrifugal suction washing device which is used for collecting vapors, gases or other medium while a washing takes place simultaneously. The gas to be washed flows downward through a tube in which a vertically aligned shaft of a fan wheel is also arranged. At the lower end of the above-mentioned tube as well as of the shaft, the fan wheel is situated which, like the above-mentioned tube, dips into the rinsing liquid. Because of the centrifugal force, the gas drawn in by means of the fan wheel is transported into the liquid and flows through this liquid upwards in the vertical direction. A spraying apparatus and a liquid mist do not exist for the purpose of an intensive gas washing. In addition, a considerable pressure drop of the gas to be washed must be expected.

Herron, U.S. Pat. No. 3,334,471 discloses a unit for humidifying a hot air stream which is fed particularly to a cotton gin. Therefore, in contrast to the initially mentioned apparatus, no washing of a gas takes place but only a moistening. This known apparatus contains a chamber with a vertical partition which serves to deflect the incoming air in the downward direction from above over the liquid. Between the surface of the liquid and the lower edge of the above-mentioned partition, a comparatively large free area exists through which the air flows in order to then flow off vertically upwards.

Published German Patent Application No. DE 3,122,026 discloses an apparatus for separating liquids and solid substances from gases which has a comparatively complex construction. This apparatus comprises a receptacle with liquid into which a tube projects for the purpose of introducing the gas to be washed from above. From the tube, the introduced gas flows through a tunnel, which is partially filled with the liquid, radially to the inside to a spraying pump which is arranged together with a fan rotor on a drive shaft. The fan rotor is surrounded by a centrifuge which is rotatably disposed on the above-mentioned drive shaft and, in addition, is surrounded by a housing whose lower edge dips into the above-mentioned washing liquid. In a first washing phase, by means of a spraying pump, the liquid, together with the gas, is thrown radially toward the outside onto a separating wall of a separating chamber. Subsequently, the gas and the liquid mist are drawn into the centrifuge, are deflected there and are centrifuged radially to the outside against a centrifuge wall. This second washing stage with the centrifuge is arranged above the rinsing liquid and, on the whole, there is a multiple deflection of the gas to be washed which results in a considerable pressure loss as well as in a high cost construction of the different components of the two washing stages.

Finally, Christian, U.S. Pat. No. 4,594,081 discloses a spraying apparatus having a cylindrical interior treatment space into which harmful gas is introduced. In the treatment space, the rotating spraying system with a tube is arranged whose lower end dips into the rinsing liquid. Radially on the outside, the treatment space is surrounded by a cylindrical jacket whose lower end is arranged at a given distance above the liquid. Between the above-mentioned jacket and the wall of the container, on the bottom of which the rinsing liquid is situated, there is a space through which the gas, after a deflection on the lower edge of the jacket, can flow off vertically upwards. Between the lower edge of the jacket and the surface of the rinsing liquid, a sufficiently large gap must exist in order to permit the passage of the gas which flows off in the downward direction from the interior treatment space. The above-mentioned space for the upward flowing gas causes a comparatively large overall diameter and agglomerating devices or traps cannot be arranged there without difficulty.

SUMMARY OF THE INVENTION

It is therefore an object of the invention to provide a gas washing apparatus in which flow conditions are improved.

Another object of the invention is to provide a gas washing apparatus which has a compact construction.

A further object of the invention is to provide a gas washing apparatus in which pressure losses are reduced.

It is also an object of the invention to provide an apparatus for washing a gas which needs only a small support surface and/or a small installation space.

Yet another object of the invention is to provide an apparatus for washing a gas in which the various components which make up the apparatus are all easily accessible even when the apparatus is installed for ultimate use, and which enables servicing and maintenance procedures to be carried out at a relatively low cost.

These and other objects have been achieved in accordance with the present invention by providing an apparatus for washing a gas with a liquid, the apparatus comprising a housing, a chamber within the housing into which gas to be washed flows, the chamber being partially filled with the liquid and containing a spraying body for pumping liquid from the chamber and spraying the liquid into the chamber, wherein the chamber comprises first and second chamber parts arranged adjacent one another, the chamber parts being separated above the liquid by a partition disposed between them, the partition at least partially projecting from above into the liquid in the chamber, and the first and second chamber parts being connected with one another at least above the liquid through a deflection area.

The apparatus of the invention is distinguished by an operationally reliable and compact construction and requires a comparatively small standing surface. The flow path for the gas to be washed is optimized, and the flow losses or the pressure drop is reduced. The harmful gas to be washed is advantageously introduced from above into the apparatus and flows substantially in a straight line through a feeding duct downward into the chamber with the washing liquid. In the chamber, the harmful gas will then flow essentially in the horizontal direction over the liquid, whereby it is subjected to the liquid mist in the chamber generated by the transporting and spraying system in order to wash it. The feeding duct for the harmful gas leads directly into the chamber with the washing liquid, so that at the lower end of the feeding duct, a simple and continuous deflection takes place by approximately 90 angular degrees from the vertical line to the horizontal line. Under these circumstances, deflection or pressure drop losses are substantially minimized.

The chamber contains a first chamber part into which the feeding duct leads and in which the transporting and spraying system is arranged. The first chamber part is adjoined by a deflection area within the chamber, whereby, in the deflection area, along a relatively long path in the horizontal plane, the gas to be washed is deflected by 180 degrees. Advantageously, the whole deflection area extends along the entire width of the apparatus. Preferably, guide elements are provided in the chamber, either in the first chamber part or in the deflection area. These guide elements result in an improvement of the flow conditions. The chamber is divided by means of a partition into two chamber parts which are connected with one another by way of the deflection area. The flow path of the gas within the chamber is essentially U-shaped with the two chamber parts which are essentially parallel to one another and the deflection or connection area. The partition projects from above into the liquid; there being at least one gap, opening or the like below the surface of the liquid which permits a liquid exchange between the two chamber parts.

In the direction of gas flow, the deflection area is adjoined by the second chamber part and above this chamber part, an outlet duct begins which extends continuously upwards from below out of the second chamber part in the vertical direction. In the outlet duct and/or at its beginning, agglomerating devices, aerosol traps as well as mist collectors are arranged. The outlet duct as well as the feeding duct extend essentially in the vertical direction parallel to one another and are separated from one another by means of a partition. Above the first chamber part, an intermediate bottom is provided which separates the chamber from an installation space situated above it. In the installation space, particularly the electric driving motor for the transporting and spraying system is arranged; the driving motor being connected with the intermediate bottom by means of a flange or the like. The drive shaft and/or the transporting and spraying system connected with this drive shaft extend from above through an opening of the intermediate bottom into the spraying chamber, the transporting system dipping into the liquid of the chamber. The installation chamber is easily accessible so that the expenses of installing the driving motor together with the transporting and spraying system are low. This also applies to disassembly and/or to possibly required servicing measures.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
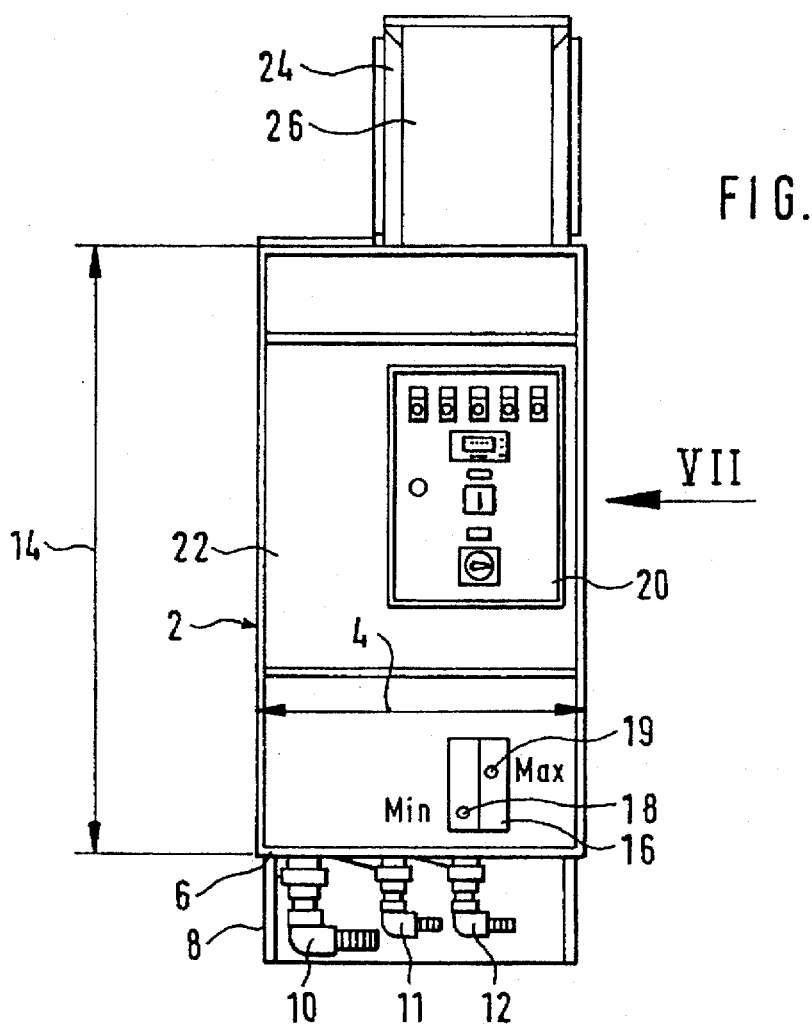
FIG. 1 is a front view of a gas washing apparatus according to the invention.

FIG. 1 is a front elevational view of an exhaust air washer apparatus whose housing 2 has a width 4 which preferably measures on the order of 60 cm. The housing 2 has a bottom 6 with downwardly extending supports or stands 8 for supporting the whole apparatus. Between the supports 8, three connections 10, 11 and 12 for pipes are provided which are used as an overflow, a drain and an inlet for water and/or washing liquid. Because of the arrangement of the connections between the supports 8, these are accessible without any difficulty even when the apparatus is installed, so that installation and servicing operations are facilitated. The housing 2 has a height 14 which is larger by a given factor than the width 4, this factor preferably being between 1.5 and 3, and particularly on the order of about 2. Because of the small width and the narrow construction of the apparatus, this apparatus can be arranged without any difficulty next to a laboratory exhaust. As will be explained in detail in the following, the housing 2 contains a chamber in its lower part for receiving the liquid, whose level can be checked through a window 16 on the front of the housing, a level controller 18, 19 also being provided there for monitoring the maximum and minimum liquid levels. Above the chamber, on the front surface of the housing, a control box 20 with switches and displays is arranged in an easily accessible manner for controlling the operation of the apparatus. On the housing 2, The control box 20 is preferably arranged on the front plate of housing 2 in a movable and removable manner, an operationally appropriate connection being provided by means of hinges or the like. If necessary, the control box may be arranged in a separate location from the housing 2 and may be appropriately combined, for example, with other control units of the laboratory exhaust. The lower area with the supports 8 and the connections 10, 11 and 12 advantageously may be covered with a removable plate or the like in order to obtain an overall structure which is closed. At the top, the housing 2 is provided with two connector pieces 24 and 26 for introducing a harmful gas to be washed and for discharging the washed gas.

Figure 2:
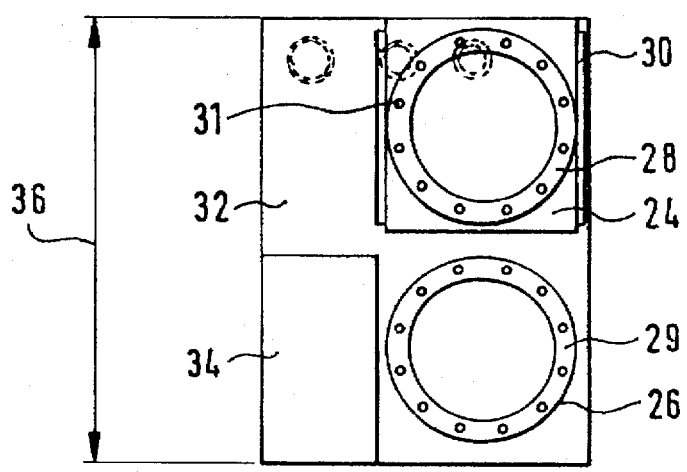
FIG. 2 is a top view of the apparatus.

FIG. 2 is a top view of the housing 2 with the connector piece 24 for introducing the harmful gas and the connector piece 26 for discharging the washed gas. Advantageously, the connector pieces 24 and 26 have flanges 28 and 29 or the like for connecting mating exhaust ducts or pipes. The connector piece 24 for the harmful gas inlet is constructed to be approximately cubic structure and/or, it has additionally or alternatively at least one, preferably two, lateral flanges 30 and 31, so that several laboratory exhausts optionally may be connected simultaneously. Furthermore, an inspection cover 34 is arranged on the top cover 32 of the housing 2 and is tightly connected with the housing. Also after the apparatus has been installed, the inspection cover 34 permits access to the interior without any difficulty and without undergoing the expense of uninstalling or disassembling the apparatus. The housing 2 has a depth 36. Taking into account its small width 4 and depth 36, the apparatus has a comparatively small footprint or support surface. The apparatus as a whole has a narrow construction which is oriented primarily in the vertical direction, particularly since the height is considerably larger than the depth 36 of the housing.

Figure 3:
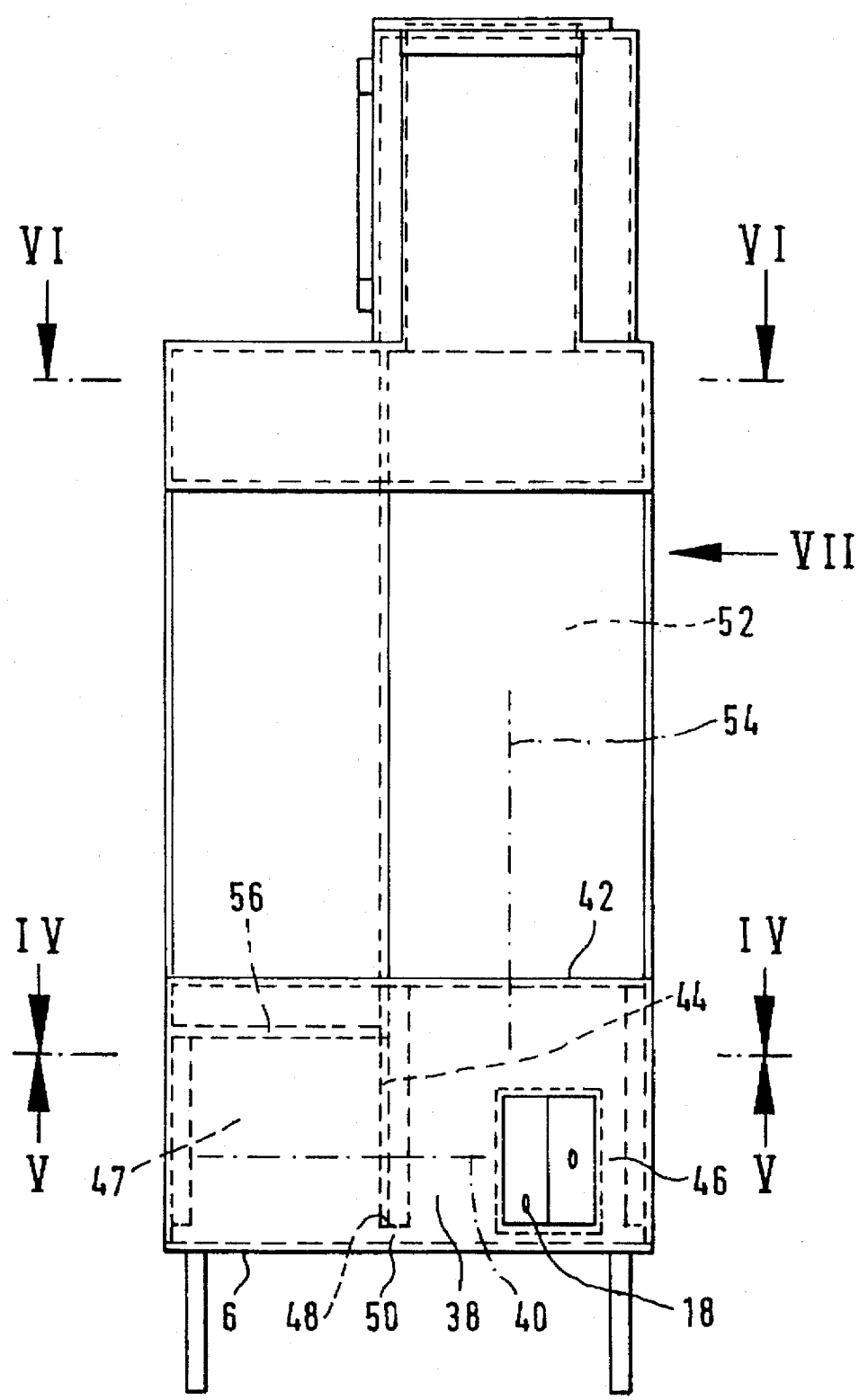
FIG. 3 is a front view of the housing, similar to FIG. 1, which shows walls and horizontal partitions which are arranged in the interior of the housing.

FIG. 3 is a front view similar to FIG. 1, with the front plate being removed, and with walls or other operating parts in the interior being shown in outline. The chamber 38, which contains the washing liquid, is located in the lower third of the overall height; the maximum level of the surface of the liquid being indicated by broken line 40. Chamber 38 is bounded at the top along a portion of its overall course by a horizontal intermediate partition 42. The gas to be washed flows essentially horizontally through the chamber 38 in the area between the surface 40 of the liquid and the intermediate partition 42. The chamber 38 is divided by means of a partition 44, which extends transversely with respect to the plane of the drawing, into a first part 46 and a second part 47. This partition 44 does not extend the whole depth of the chamber, but only along a portion thereof, and in a deflection or connection area, the two chamber parts 46, 47 are connected with one another. In addition, the partition 44 separates the two chamber parts 46, 47, through which the gas flows, from one another. At the top, the partition 44 is tightly and fixedly connected to the intermediate partition 42, and the bottom edge 48 of partition 44 projects from above a predetermined distance into the liquid 40. Between the lower edge 48 of partition 44 and the bottom 6 of chamber 38, there is a gap 50 through which liquid exchange is permitted between the two chamber parts 46, 47. The spacing of the lower edge 48 from the bottom 6 or the size of the gap 50 is provided such that, even when the liquid is at the minimum level, the partition 44 will still reliably dip into the liquid. Thus, as shown in the drawing, the minimum level controller 18 is arranged at a larger distance above the bottom 6 than the lower edge 48 of the partition.

Instead of providing a gap 50 which extends continuously along the length of the partition 44, the partition 44 may also be connected with the bottom 6, and suitable openings, slots, webs or the like may be provided to facilitate unimpaired liquid exchange between the two chamber parts 46 and 47, while above the liquid the partition 44 separates the areas of the chamber through which the gas flows from one another. Thus a good mixing of the washing or rinsing liquid is assured, so that its chemical composition and/or its electrical conductivity exhibits virtually no local differences. At the same time, the relatively small base surface or footprint area is used entirely for receiving the liquid. Furthermore, there are no pipe passages or the like in the bottom of the chamber 38, and the whole bottom surface of the chamber is covered by the liquid.

Above the first chamber part 46, an installation space 52 is situated which, according to FIG. 3, is disposed behind the plane of the drawing and in which a driving motor is arranged whose axis of rotation is illustrated by a broken line 54. A transporting and spraying system corresponding to that described in the aforementioned European Patent Application No. EP 330,096 is connected with this driving motor, the transporting body of this transporting and spraying system dipping into the liquid in the first chamber part 46. The spray body is disposed in the area situated above the liquid in order to form a mist of the liquid there for washing the stream of harmful gas flowing therethrough. In the second chamber part 47, a perforated plate 56 is situated through which the gas mixed with the liquid mist can be discharged in the upward direction. Above the perforated plate, agglomerating devices and aerosol traps are arranged. Advantageously, the agglomerating devices and aerosol traps, which are not shown here, may be supported by means of the perforated plate 56.

Figure 4:
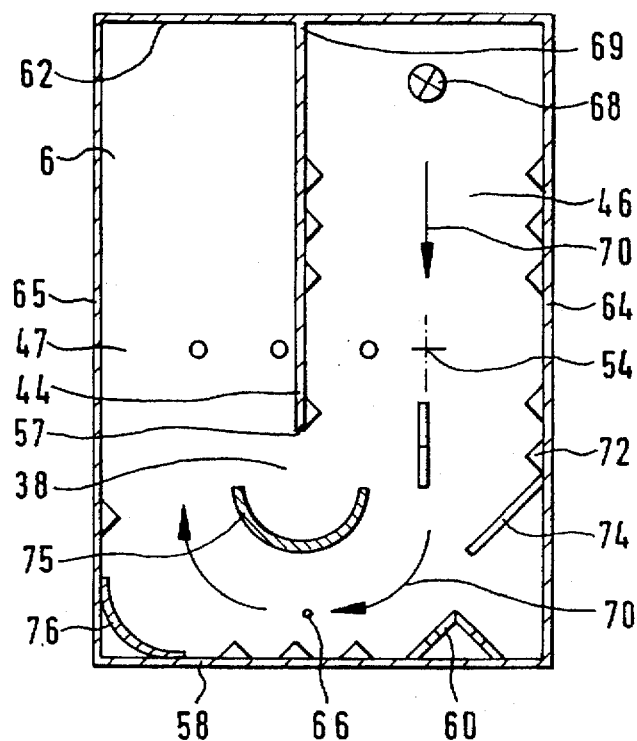
FIG. 4 is a sectional view taken along section line IV of FIG. 3.

FIG. 4 is a horizontal sectional view of the chamber 38, the partition 44 and the two chamber parts 46, 47 being easily recognizable. In the area of the first, preferably forward, transverse wall 58, a holder 60 is arranged for the two above-mentioned level controllers, which, however, are not shown in this figure. The partition 44 ends at a second, preferably rear, transverse wall 62, and extends from it essentially parallel to the two sidewalls 64 and 65 of the housing. The two chamber parts 46, 47 are therefore also arranged parallel next to one another, and liquid exchange therebetween can take place through the gaps or openings situated above the bottom of the chamber.

The liquid can also flow from one chamber part into the other by way of a forward connection area 66. In accordance with the invention, the distance between the free edge 57 of partition 44 and the first transverse wall 58 is essentially equal to the width of the first chamber part 46. The other end 69 of the partition 44 is tightly and fixedly connected with the second transverse wall 62. The whole surface above the bottom 6, which is enclosed by the two lateral walls and the two transverse walls, is covered by liquid. The first chamber part 46 contains the transporting and spraying system whose axis of rotation 54 is orthogonal to the plane of the drawing. The harmful gas to be washed flows from above, i.e. in the viewing direction onto the plane of the drawing, into the first chamber part 46, as indicated by the arrow 68. The incoming harmful gas is deflected in the area of the intermediate partition 42 and the surface of the liquid 40, and will then flow essentially horizontally toward the front of the spraying system and into the deflection area, as indicated by arrows 70. After a deflection of essentially 180 degrees in the deflection area, the mixture of gas and liquid mist will arrive in the second chamber part 47 in order to then be discharged from this chamber part in the vertically upward direction through the above-mentioned perforated plate. In the first chamber part 46 and in the deflection area, guiding elements 72, which induce a swirling motion, are provided on the partition 44, on the sidewall 64 and on the first transverse wall 58. In addition, guiding elements 74, 75, 76 are provided for improving the flow guidance.

Figure 5:
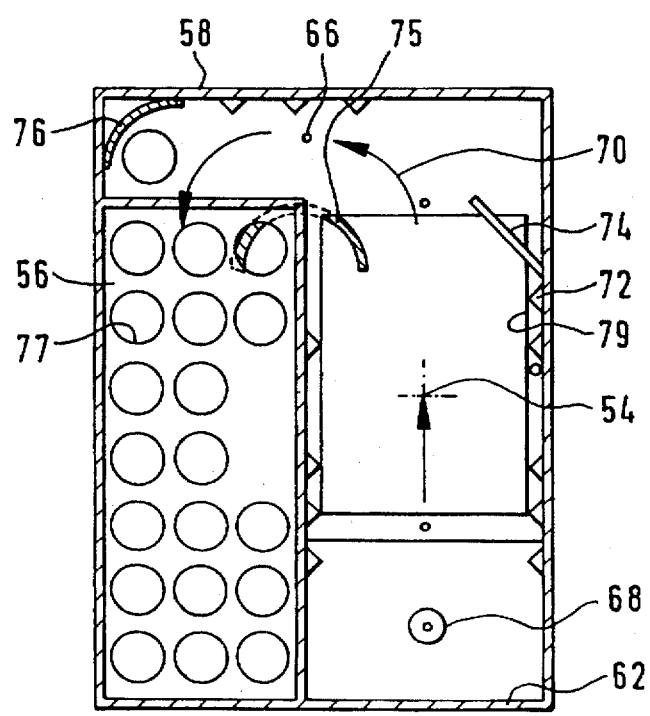
FIG. 5 is a sectional view taken along section line V of FIG. 3.

FIG. 5 is a horizontal sectional view of the housing 2 in the sectional plane corresponding to FIG. 4, except in the upward viewing direction. The perforated plate 56 of the second chamber part has a number of openings 77 through which the washed gas can be discharged in the upward direction, i.e. behind the plane of the drawing. The above-mentioned agglomerating devices, aerosol traps and mist collectors are situated above the perforated plate 56. As indicated by the tip of the arrow 68, the harmful gas flows from above, i.e. from the direction behind the plane of the drawing, into the first chamber part 46 and is deflected according to the arrows 70 into the horizontal plane. The intermediate partition 42 contains a recess 79 which is closed by means of a plate which carries the driving motor. After passing through the spraying system rotating about the axis of rotation 54, the gas passes through the deflection area 66 to the second chamber part 47. The partition 44 separates the chamber parts 46, 47, through which the gas can flow, from one another. Because of the previously described guiding of the gas flow, pressure losses are reduced to a minimum.

Figure 6:
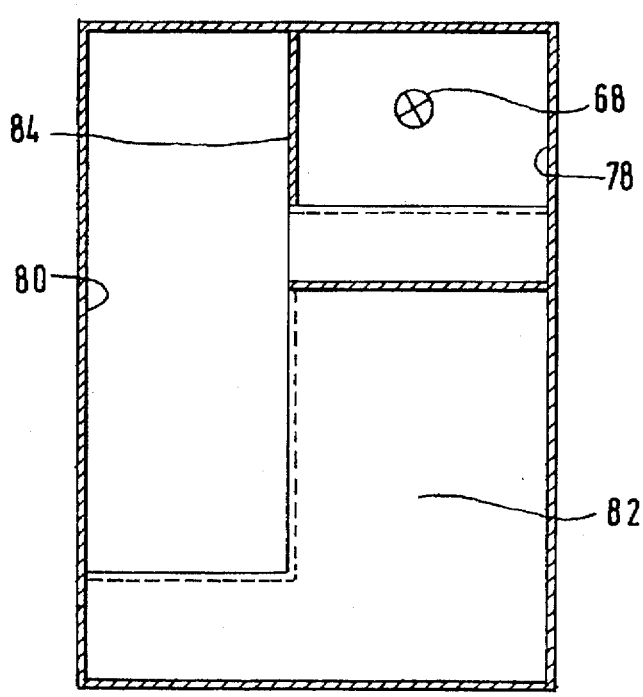
FIG. 6 is a sectional view taken along section line VI of FIG. 3.

FIG. 6 is a sectional view in the downward viewing direction taken along section line VI through the upper part of the housing 2. The harmful gas passes through the inlet connector piece situated on top of the housing into the inlet duct 78 and flows vertically downwardly through this inlet duct 78 as indicated by the arrow 68. After flowing through the chamber parts 46 and 47 and the perforated plate 56 as described above and passing the agglomerating devices and aerosol traps, the washed gas flows vertically upwardly through the outlet duct 80 and in the area of the sectional plane may arrive in a transition duct 82 which is situated underneath the outlet connection piece. This arrangement provides large flow cross-sections and gradual direction deflections, so that favorable flow conditions are achieved. The inlet duct 78 and the outlet duct 80 extend parallel to one another along a significant portion of the overall height of the apparatus and are separated from one another by a vertical partition 84.

Figure 7:
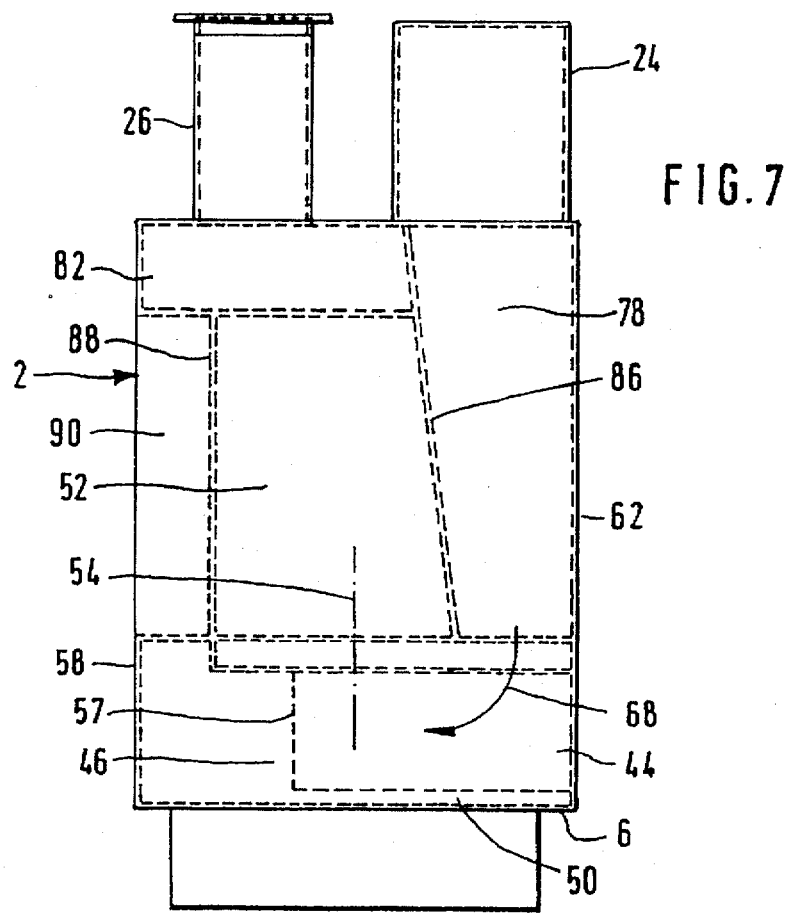
FIG. 7 is a side view of the apparatus viewed in the direction of arrow VII of FIG. 3.

FIG. 7 is a side view of the housing with the first connector piece 24 for the harmful gas inlet and the second connector piece 26 for the outlet of the washed gas. The inlet duct 78 has another partition 86 which is arranged to be diagonally sloped with respect to the second rearward transverse wall 62. As a result, a favorable flow is achieved for the harmful gas flowing into the first chamber part 46 according to arrow 68. The first partition 44 dipping into the liquid extends from the second, preferably rearward, transverse wall 62 toward the first, preferably forward, transverse wall 58, the aforementioned gap 50 extending between the lower edge 48 of partition 44 and the bottom 6 of housing 2. In addition, the installation space 52 for the driving motor with the axis of rotation 54 is easily recognizable. Separated from the installation space 52 by means of a partition 88, a control space 90 for the control box is provided. Advantageously, the partition 88 can be removed so that, after opening the control box, the installation space and the driving motor arranged therein are readily accessible.

Figure 8:
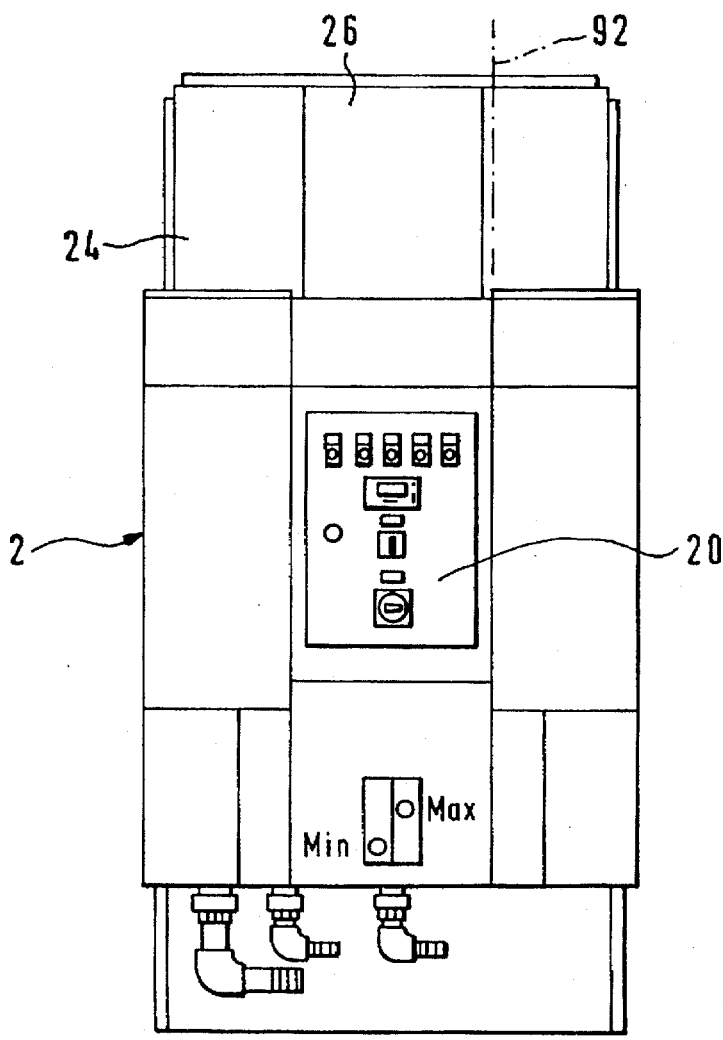
FIG. 8 is a front view of another embodiment.
Figure 9:
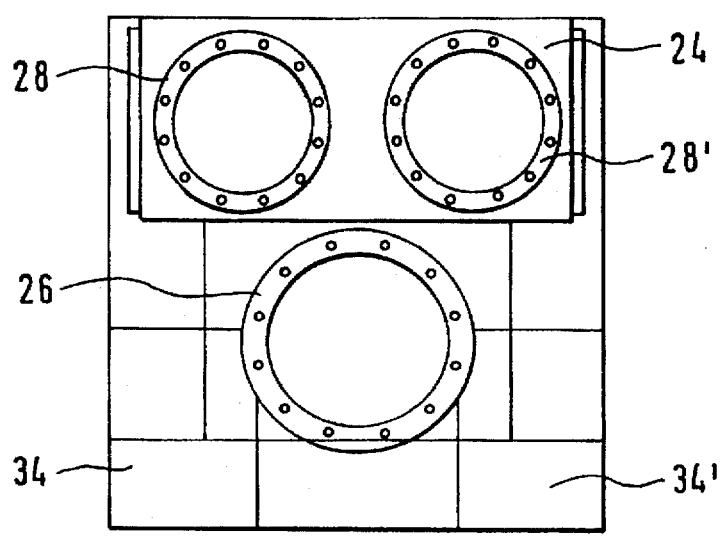
FIG. 9 is a top view of the apparatus of FIG. 8.

FIGS. 8 and 9 are a front view and a top view of another embodiment of the apparatus which is designed for an increased gas flow rate. In FIG. 8, the control box 20 in the housing 2 can be seen corresponding to the first embodiment. The construction of this apparatus according to FIG. 8 on the left next to the auxiliary line 92 corresponds substantially to the construction of the first embodiment.

Behind the control box 20, the driving motor is situated whose transporting and spraying system, in turn, dips into the first chamber part. In this embodiment, the first chamber part is not arranged on the side, but in the center of the housing. In the embodiment according to FIG. 8, the second chamber part is arranged on the left next to the first chamber part and, in addition, on the right, another, third chamber part is arranged. The gas flowing out of the central first chamber part is therefore deflected through two deflecting areas partially to the left and partially to the right into the second chamber part and into the third chamber part. It should be explicitly mentioned that, in this embodiment, a partition similar to partition 44 also is provided for the third chamber part according to FIG. 8, i.e. the right chamber part, in which case, a gap, openings or the like for liquid exchange exist below the surface of the washing liquid. Thus, in accordance with the invention, there are two partitions next to the central first chamber part, the first partition on one side of the central chamber and the second on the other side, and the apparatus has an overall width on the order of 90 cm.

According to FIG. 9, the first connector piece 24 has a rectangular configuration, and on its top it has two flanges 28 and 28' for harmful gas inlets. A common outlet connection piece 26 is provided for the washed gas. In addition, two inspection covers 34, 34' are provided so that the interior space is easily accessible whenever necessary.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for washing a gas with a liquid, said apparatus comprising a housing, a chamber within said housing into which gas to be washed flows, said chamber being partially filled with the liquid and containing a spraying body for pumping liquid from the chamber and spraying the liquid into the chamber, wherein said chamber comprises first and second chamber parts arranged adjacent one another, said chamber parts being separated above the liquid by a partition disposed between them, said partition at least partially projecting from above into the liquid in the chamber, and said first and second chamber parts being connected with one another at least above the liquid through a deflection area arranged adjacent a vertical edge of said partition so as to overlap open sides of said first and second chamber parts with said liquid covering respective bottom surfaces of said first chamber part, of said deflection area and of said second chamber part, and wherein gas to be washed flows essentially horizontally across said liquid from the first chamber part through the deflecting area around the vertical edge of said partition and into the second chamber part.

2. An apparatus according to claim 1, wherein gas to be washed flows from above into the first chamber part.

3. An apparatus according to claim 1, wherein washed gas is discharged from the second chamber part essentially vertically upwardly through an outlet duct.

4. An apparatus according to claim 1, wherein at least one gap or opening is provided in said partition under a surface of the liquid for enabling liquid to pass between said first and second chamber parts.

5. An apparatus according to claim 4, wherein a gap is provided between a lower edge of the partition and a bottom of the chamber in said housing.

6. An apparatus according to claim 1, wherein a perforated plate provided with a plurality of openings therethrough is arranged between the second chamber part and an overlying outlet duct, and washed gas is discharged from the second chamber part through the openings of said plate vertically upwardly into the outlet duct.

7. An apparatus according to claim 1, wherein the housing has a bottom provided with a plurality of downwardly projecting supports.

8. An apparatus according to claim 7, wherein at least one liquid connection for washing liquid is provided underneath the housing bottom between said supports.

9. An apparatus according to claim 1, wherein the partition between said first and second chamber parts is arranged at least substantially parallel to two sidewalls of said housing.

10. An apparatus according to claim 1, wherein the housing has a bottom surface bounded by a front wall, a rear wall and two sidewalls of said housing, and said chamber extends essentially over the entire bottom surface of said housing.

11. An apparatus according to claim 10, wherein the chamber bottom surface has a substantially rectangular configuration.

12. An apparatus according to claim 1, wherein said partition has one vertical edge fixedly connected to a rear wall of said housing and a second vertical edge spaced away from a front wall of said housing, said deflection area between said first and second chamber parts being arranged between said second vertical edge of said partition and said front wall of said housing.

13. An apparatus according to claim 1, wherein said spraying body is arranged in said first chamber part.

14. An apparatus for washing a gas with a liquid, said apparatus comprising a housing, a chamber within said housing into which gas to be washed flows, said chamber being partially filled with the liquid and containing a spraying body for pumping liquid from the chamber and spraying the liquid into the chamber, wherein said chamber comprises first and second chamber parts arranged adjacent one another, said chamber parts being separated above the liquid by a vertical partition disposed between them, said housing further comprising an intermediate horizontal partition which separates the chamber from an overlying, vertically oriented inlet duct and an overlying vertically oriented outlet duct extending substantially parallel to the inlet duct, said vertical partition extending upward to abut said horizontal partition and at least partially projecting from above into the liquid in the chamber, and said first and second chamber parts being connected with one another at least above the liquid through a deflection area arranged adjacent a free vertical edge of said vertical partition.

15. An apparatus according to claim 14, wherein an installation space for receiving a driving motor is provided interiorly of said housing above said intermediate horizontal partition, said driving motor being operatively connected with said spraying body to rotate said spraying body in said chamber.

16. An apparatus according to claim 15, wherein said installation space is defined by a recess formed in said intermediate horizontal partition, and said driving motor is supported on and secured to a plate fastened to said horizontal partition so as to cover said recess.

17. An apparatus according to claim 14, wherein said spraying body is arranged in said first chamber part.

* * * * *